(12) United States Patent
Ghosh et al.

(10) Patent No.: US 9,942,922 B2
(45) Date of Patent: Apr. 10, 2018

(54) RESTRICTING ENHANCED DISTRIBUTED COORDINATION ACCESS (EDCA) IN A HIGH EFFICIENCY WIRELESS LOCAL-AREA NETWORK

(71) Applicant: Intel IP Corporation, Santa Clara, CA (US)

(72) Inventors: Chittabrata Ghosh, Fremont, CA (US); Daniel F. Bravo, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 212 days.

(21) Appl. No.: 14/862,480

(22) Filed: Sep. 23, 2015

(65) Prior Publication Data

US 2016/0323807 A1 Nov. 3, 2016

(51) Int. Cl.
*H04W 74/08* (2009.01)
*H04W 84/12* (2009.01)

(52) U.S. Cl.
CPC ........ *H04W 74/0833* (2013.01); *H04W 84/12* (2013.01)

(58) Field of Classification Search
None
See application file for complete search history.

(56) References Cited

U.S. PATENT DOCUMENTS

2014/0328264 A1* 11/2014 Merlin ................. H04W 74/04
370/329
2015/0351115 A1* 12/2015 Jeon ..................... H04W 48/16
455/450

* cited by examiner

*Primary Examiner* — Chi P Pham
*Assistant Examiner* — Raul Rivas
(74) *Attorney, Agent, or Firm* — Schwegman Lundberg & Woessner, P.A.

(57) ABSTRACT

Apparatuses, computer readable media, and methods for restricting enhanced distributed coordination access (EDCA) in a high-efficiency wireless local-area network (HEW) are disclosed. The apparatus of a HEW station may include processing circuitry and transceiver circuitry. The processing circuitry and transceiver circuitry may be configured to configure the HEW station for operation in enhanced distributed coordinated access (EDCA) restricted mode, where in EDCA restricted mode the HEW station is configured to refrain from EDCA packet transmission. The processing circuitry and transceiver circuitry may be further configured to configure the HEW station for operation in non-EDCA restricted mode where in non-EDCA restricted mode the HEW station is configured to: increase a EDCA attempt failure counter when acknowledgement of an EDCA-transmitted packet is not received within a predetermined period of time, and enter EDCA restricted mode when the EDCA attempt failure counter equals a EDCA threshold.

19 Claims, 7 Drawing Sheets

RESTRICTING ENHANCED DISTRIBUTED COORDINATION ACCESS (EDCA) IN A HIGH EFFICIENCY WIRELESS LOCAL-AREA NETWORK

PRIORITY CLAIM

This application claims the benefit of priority under 35 USC 119(e) to U.S. Provisional Patent Application Ser. No. 62/155,499, filed May 1, 2015, which is incorporated herein by reference in its entirety.

TECHNICAL FIELD

Embodiments relate to Institute of Electrical and Electronic Engineers (IEEE) 802.11. Some embodiments relate to high-efficiency wireless local-area networks (HEWs). Some embodiments relate to restricting enhanced distributed coordination access (EDCA). Some embodiments relate to restricting EDCA for an exponential period based on a number of failures. Some embodiments relate to trigger frames for random (TF-R) channel access.

BACKGROUND

Efficient use of the resources of a wireless local-area network (WLAN) is important to provide bandwidth and acceptable response times to the users of the WLAN. However, often there are many devices trying to share the same resources and the devices may interfere with one another. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
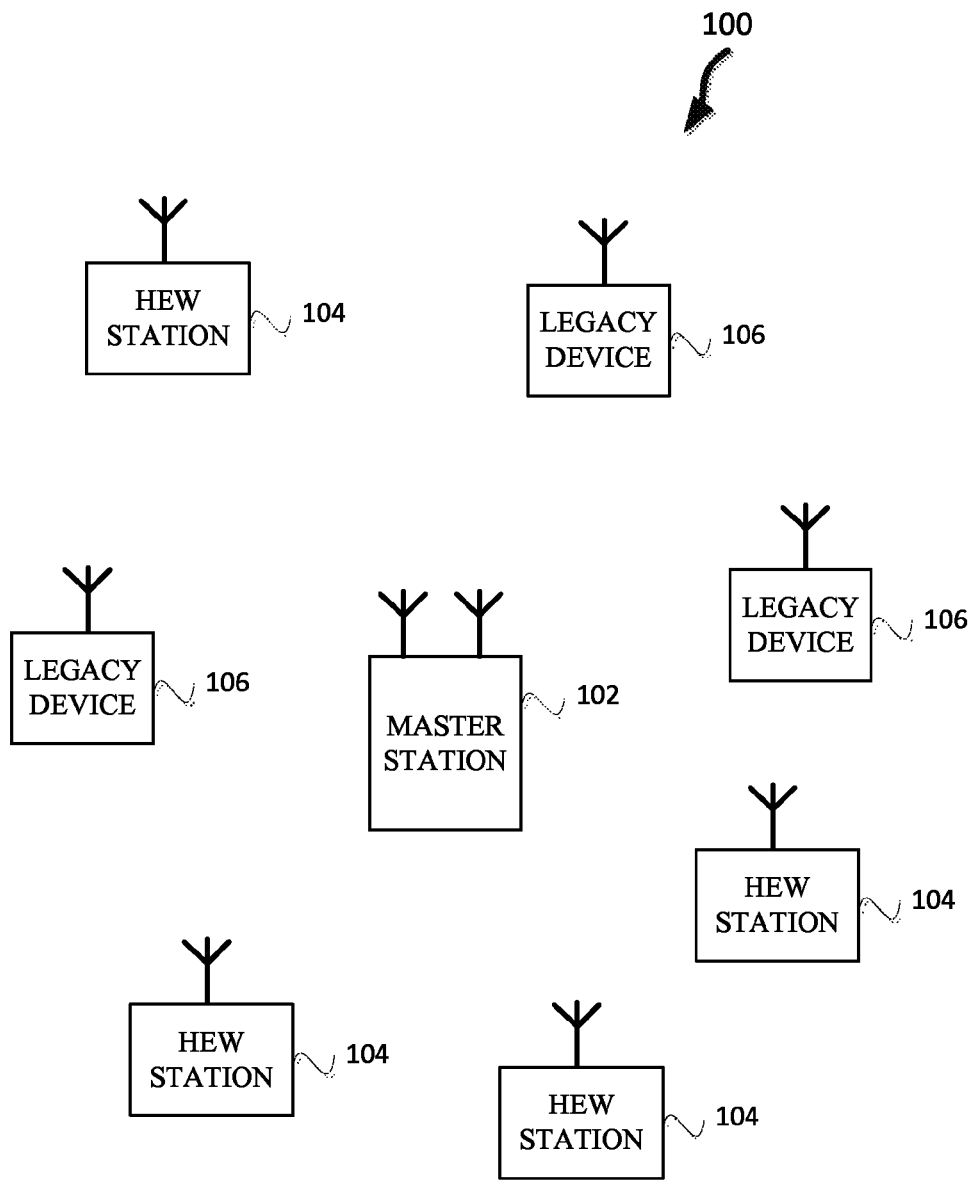
FIG. 1 illustrates a WLAN 100 in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11 ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-7.

Figure 2:
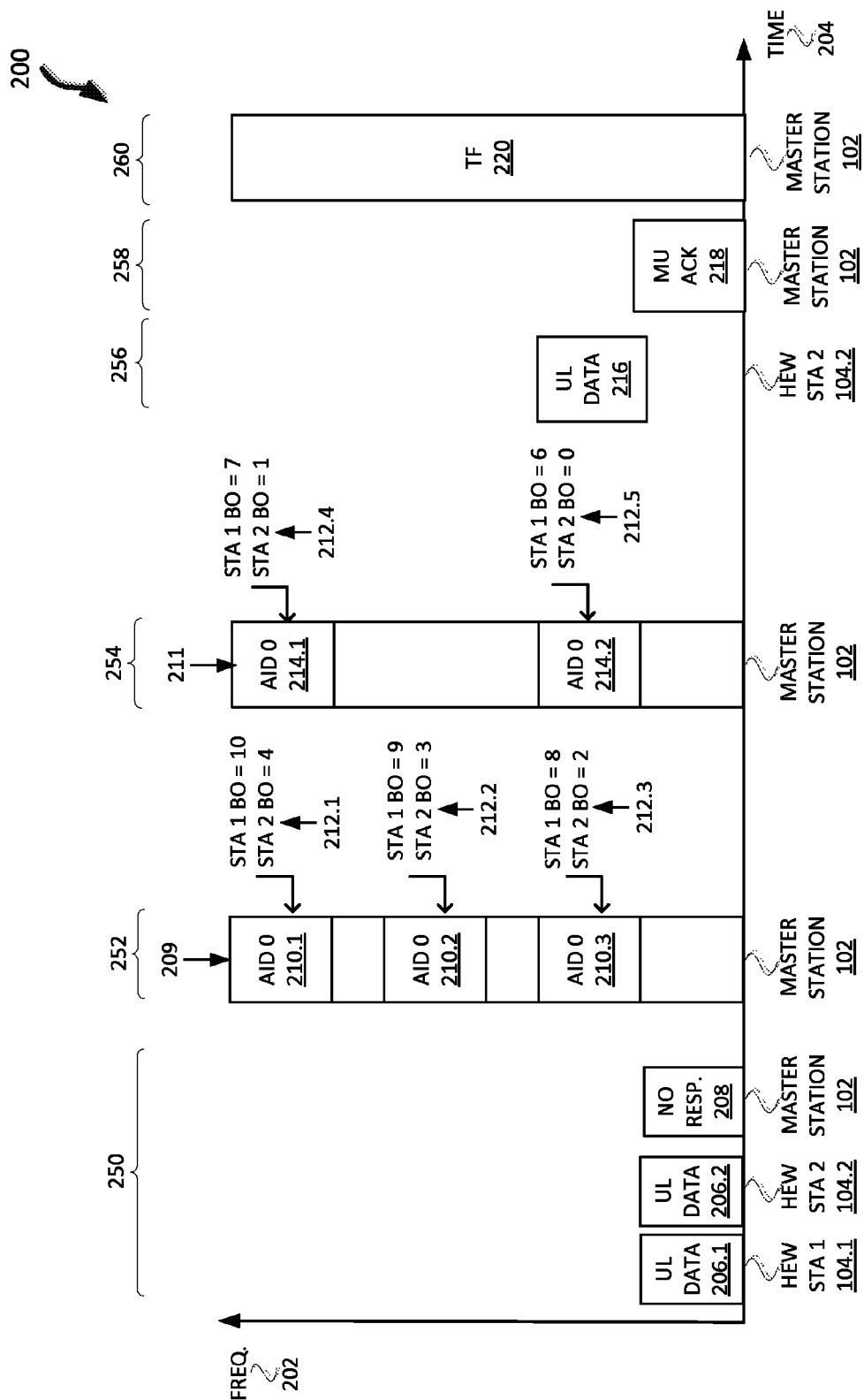
FIG. 2 illustrates a method for orthogonal frequency division multiple access distributed channel access (ODCA) and EDCA in accordance with some embodiments.

FIG. 2 illustrates a method for orthogonal frequency division multiple access distributed channel access (ODCA) and EDCA 200 in accordance with some embodiments. Illustrated in FIG. 2 is frequency 202 along a vertical axis and time 204 along a horizontal axis. The device transmitting is indicated below the time 204. The operation is indicated along the top. The method 200 may begin at operation 250. Both HEW STA 1 104.1 and HEW STA 2 104.2 may have data to send to master station 102. Both HEW STA 1 104.1 and HEW STA 2 104.2 may use EDCA to attempt to transmit the data to the master station 102. HEW STA 1 104.1 and HEW STA 2 104.2 may transmit UL data 206.1 and UL data 206.1, respectively. The master station 102 may not send any response to UL data 206.1 and UL data 206.2, which is indicated by no response 208. The HEW STA 104 may determine that no response has been received based on a predetermined time to wait for a response.

HEW STA 1 104.1 and HEW STA 2 104.2 may not be able to transmit with bandwidths to the master station 102 because there may be a power asymmetry between HEW STA 1 104.1 and HEW STA 2 104.2 and the master station 102.

For example, the master station 102 may be able to transmit on a 20 MHz channel to HEW STA 1 104.1 and HEW STA 2 104.2, and HEW STA 1 104.1 and HEW STA 2 104.2 may be able to receive the transmission from the master station 102. But, due to the power asymmetry with HEW STA 1 104.1 and HEW STA 2 104.2 being lower power devices, HEW STA 1 104.1 and HEW STA 2 104.2 may need to use a lower bandwidth channel to transmit to the master station 102. For example, HEW STA 1 104.1 and HEW STA 2. 104.2 may need to use 2 MHz channel to transmit to the master station 102. The 2 MHz channel may only be available as part of an OFDMA transmission opportunity after the master station 102 transmits a trigger frame. There may be no mechanism for HEW STA 1 104.1 and HEW STA 2 104.2 to notify the master station 102 that they have data to send and are currently in a state where traditional EDCA access cannot be used do to the channel size being too large (e.g., 20 MHz).

The method 200 continues at operation 252 with the master station transmitting a trigger frame for random access (TR-R) 209. HEW STA 1 104.1 and HEW STA 2 104.2 may attempt to gain a slot and transmit based on the TR-R 206. HEW STA 1 104.1 and HEW STA 2 104.2 may randomly select a backoff counter (BO). For example, HEW STA 1 104.1 may select a BO of 11 and HEW STA 2 104.2 may select a BO of 5.

STA 1 BO=10 and STA 2 BO=4 at 212.1 when HEW STA 1 104.1 and HEW STA 2 104.2 attempt to access AID 0 210.1. AID 0 206 may indicate that the subchannel is available for random access uplink transmission from a HEW STA 104. HEW STA 1 104.1 and HEW STA 2 104.2 may not transmit until the BO reaches zero. HEW STA 1 104.1 and HEW STA 2 104.2 may continue to attempt to use an AID 0 210 subchannel with STA 1 BO=9 STA 2 BO=3 at 212.2, and STA 1 BO=8 STA 2 BO=2 212.3. Neither HEW STA 1 104.1 nor HEW STA 2 104.2 may get an AID 0 206 subchannel in the transmission opportunity initiated by TR-R 209. Other HEW STAs 104 may transmit uplink data to the master station 102 between TR-R 209 and TR-R 211.

The method 200 may continue at operation 254 with the master station 102 transmitting another TR-R 211. The BO of HEW STA 1 104.1 may not permit it to transmit, but the BO of HEW STA 2 104.1 may countdown to zero at 212.5. The method 200 continues at operation 256 with HEW STA 2 104.2 transmitting UL data 216 to the master station 102. The UL data 216 may be a resource request to the master station 102 for a trigger frame (TF) that will allocate more resources to HEW STA 2 104.2. The UL data 210 may be transmitted on a subchannel that has a smaller bandwidth than 20 MHz such as 2 MHz.

The method 200 continues at operation 258 with the master station 102 transmitting a multi-user (MU) acknowledgement (ACK) to the UL data 218. The MU ACK 218 may be on a larger channel than the UL data 216. For example, MU ACK 218 may be on a 20 MHz channel and UL data 216 may be only on a 2 MHz channel. The method 200 may continue at operation 260 with the master station 102 transmitting a TF 220. The TF 220 may not be a TF-R so there may be no opportunity for a HEW STA 104 to transmit unless the HEW STA 104 is referred to in a resource allocation (not illustrated) of the TF 214. The TF 214 may include a resource allocation for HEW STA 2 104.2 in response to UL data 216 which may have been a resource request to the master station 102. In some embodiments, the master station 102 may be configured to transmit successive TF-Rs 209, 211 that may be termed cascade TF-Rs 209, 211. A TF-R 209, 211 may include an indication of whether or not it is the last TF-R 209, 211 in a cascade of TF-Rs 209, 211. In some embodiments, a first TF-R 209, 211 may indicate a number of TF-Rs 209, 211 in a cascade of TF-Rs 209, 211.

In some embodiments, HEW STA 1 104.1 and HEW STA 2 104.2 may have attempted multiple times using EDCA to transmit to the master station 102 and not have received an acknowledgement. The multiple attempts from HEW STA 1 104.1 and HEW STA 2 104.2 may make it more difficult for others HEW STA 104 to transmit to the master station 102 outside of transmission opportunities. The TF-R 209, 211 may indicate different ways for the HEW STAs 104 to access channels randomly. The method 200 may end.

Figure 3:
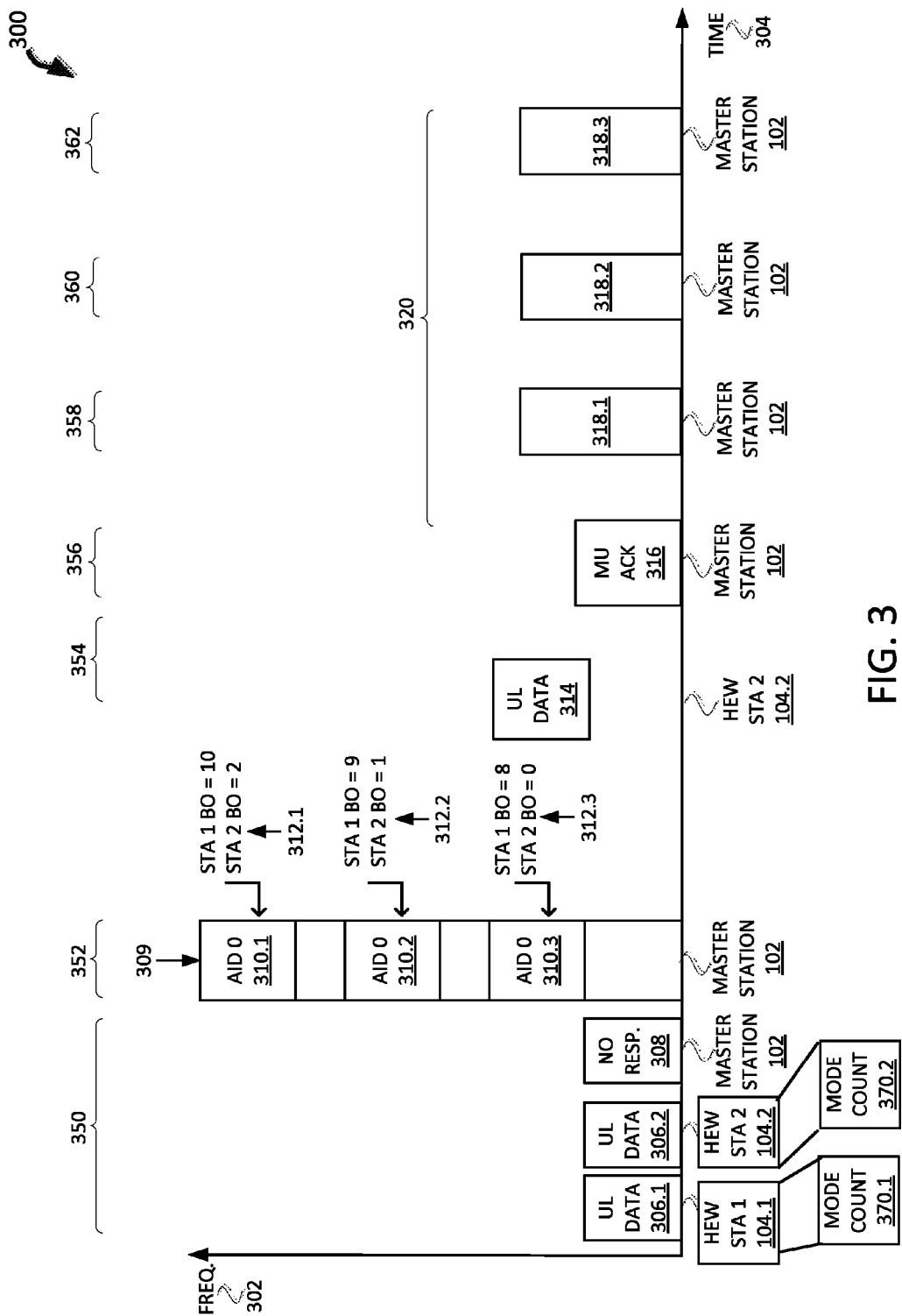
FIG. 3 illustrates a method for restricting EDCA in accordance with some embodiments.

FIG. 3 illustrates a method 300 for restricting EDCA in accordance with some embodiments. Illustrated in FIG. 3 is frequency 302 along a vertical axis and time 304 along a horizontal axis. The device transmitting is indicated below the time 304. The operation is indicated along the top.

The method 300 may begin at operation 350. Both HEW STA 1 104.1 and HEW STA 2 104.2 may have data to send to master station 102. Both HEW STA 1 104.1 and HEW STA 2 104.2 may use EDCA to attempt to transmit the data to the master station 102. HEW STA 1 104.1 and HEW STA 2 104.2 may transmit UL data 306.1 and UL data 306.1, respectively. The master station 102 may not send any response to UL data 306.1 and UL data 306.2, which is indicated by no response 308. HEW STA 1 104.1 and HEW STA 104.2 may increment a mode count 370 to indicate a failed EDCA attempt. Mode count 370 may indicate a number of failed attempts by the HEW STA 104. If the mode count 370 reaches or exceeds a threshold then the corresponding HEW STA 104 may enter EDCA restricted mode. In some embodiments, in EDCA restricted mode the HEW STA 104 may not attempt EDCA until the HEW STA 104 comes out of EDCA restricted mode. In some embodiments, in EDCA restricted mode the HEW STA 104 may refrain from attempting EDCA until the HEW STA 104 comes out of EDCA restricted mode. The HEW STA 104 may still participate with either TF-Rs or TFs in EDCA restricted mode. The HEW STAs 104 may leave EDCA restricted mode in some embodiments by transmitting in a TF-R 309.

The HEW STAs 104 may leave EDCA restricted mode in some embodiments by either transmitting in a TF-R 309 or waiting a number of beacon frames that is based on the number of failed EDCA attempts. For example, in some embodiments the number of beacon frames may be $2^{\wedge}(i)$ or $(2^{\wedge}(i)-1)$ where i is the number of failed EDCA attempts. In some embodiments, the HEW STA 104 may leave EDCA restricted mode by waiting a number of beacon frames that is based on the number of failed EDCA attempts. Mode count 370.1 and mode count 370.2 may both be one after operation 350.

The method 300 continues at operation 352 with the master station 102 transmitting a TF-R 309. Both HEW STA 1 104.1 and HEW STA 2 104.2 may attempt to gain a resource allocation, e.g. a sub-channel and duration, indicated in the TF-R 309. In some embodiments, HEW STA 1 104.1 and HEW STA 2 104.2 randomly generate a backoff count and based on the backoff count HEW STA 2 104.2 receive a resource allocation in AID 0 310.3. HEW STA 1 104.1 does not receive a resource allocation. As illustrated the backoff count is used to count down the resource allocations and if the backoff count goes to zero then the HEW STA 104 will transmit using that resource allocation. For example, STA 1 BO=10 STA 2 BO=2 312.1, where HEW STA 1 104.1 randomly generated a backoff count of 10 and HEW STA 2 104.2 randomly generated a backoff count of 2. STA 1 BO=9 STA 2 BO=9 STA 2 BO 1 312.2, where both HEW STA 1 104.1 and HEW STA 2 104.2 decremented their BO's by 1 when moving to the next resource allocation AID 0 310.2. And, finally, STA 1 BO=8 STA 2 BO=0, where the backoff counter of HEW STA 1 104.1 is decremented to zero so HEW STA 1 104.1 selects resource allocation AID 0 310.3 to attempt to transmit on.

The method 300 continues at operation 354 with HEW STA 2 104.2 transmitting a UL data 314 to the master station 102. HEW STA 2 104.2 may be using the resource allocation AID 0 310.3 to determine the subchannel and duration to transmit UL data 314. In some embodiments since HEW STA 2 104.2 transmitted UL data 314, the mode count 370.2 may be set back to zero. The method 300 may continue at operation 356 with the master station 102 transmitting a MU ACK 316 which may include an ACK to HEW STA 2 104.2 for UL data 314. In some embodiments another HEW STA 104 may have simultaneously transmitted on AID 0 310.3 which may have interfered with the transmission of UL data 314.

The method 300 continues with operation 358, 360, and 363, where the master station 102 is transmitting beacon frames 318. HEW STA 1 104.1 may have entered EDCA restricted mode 320 and may have to wait three beacon frames 318 before being able to attempt another EDCA transmission. HEW STA 2 104.2 may have had the same mode count 370 as HEW STA 1 104.1 after operation 350 but may have had its mode count 370.2 set to zero since it transmitted UL data 314. The number of beacon frames HEW STA 1 104.1 has to wait to leave EDCA restricted mode 320 may be determined by $(2^{\wedge}i-1)$ with i being one or mode count 370.1, so HEW STA 1 104.1 may have to wait $2^{\wedge}1-1=3$ beacon frames 318. After receiving beacon 318.3 HEW STA 1 104.1 may reset mode count 370.1 to zero and leave EDCA restricted mode 320. The method 300 may end. In some embodiments HEW STA 2 104.2 may also be in EDCA restricted mode 320 since the mode count 370.2 may not have been reset based on participation in a TF-R 309 in the UL data 314 transmission.

Figure 4:
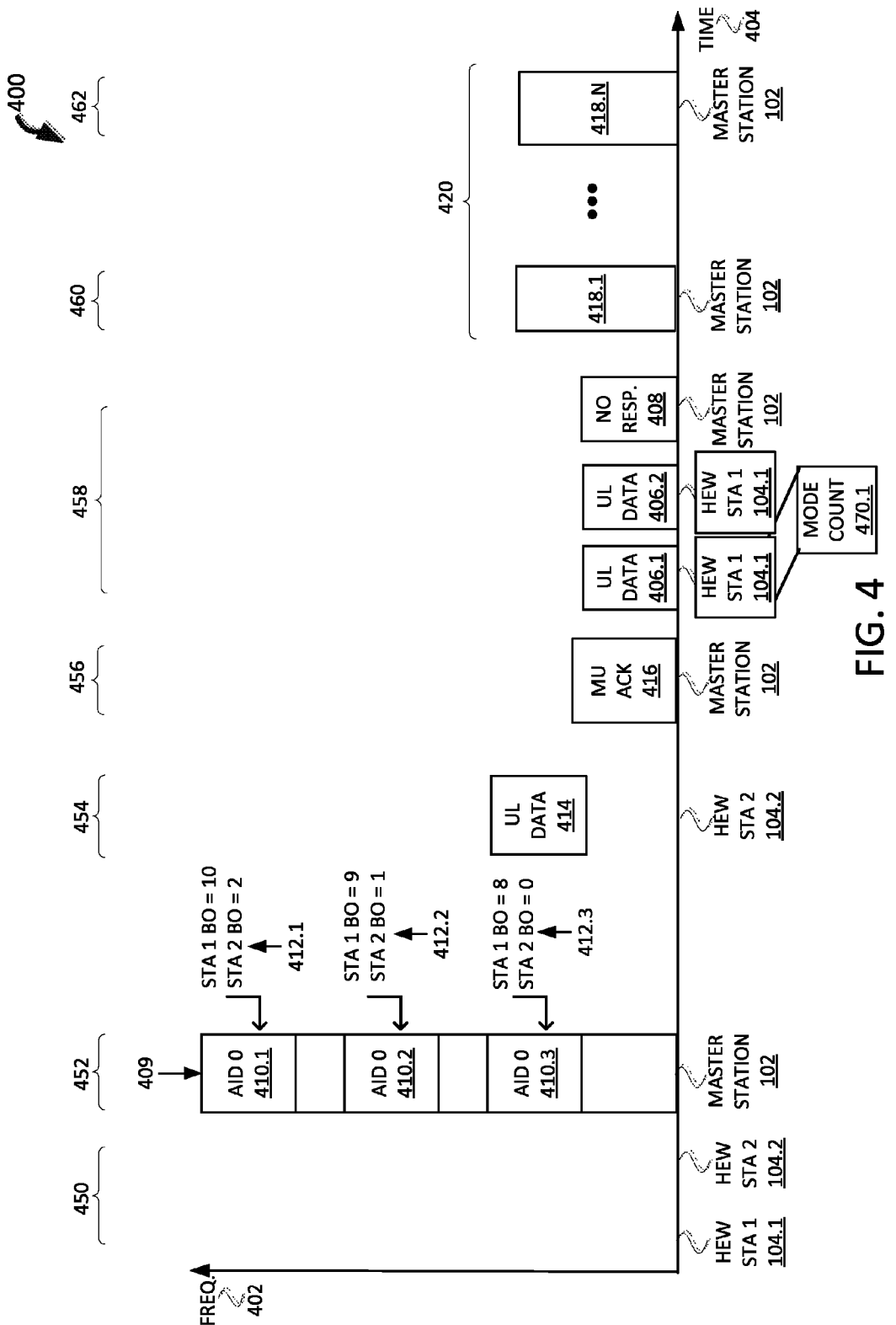
FIG. 4 illustrates a method for restricting EDCA in accordance with some embodiments.

FIG. 4 illustrates a method 400 for restricting EDCA in accordance with some embodiments. Illustrated in FIG. 4 is frequency 402 along a vertical axis and time 404 along a horizontal axis. The device transmitting is indicated below the time 404. The operation is indicated along the top.

The method 400 begins at operation 450 where HEW STA 1 104.1 and HEW STA 2 104.2 both have data to transmit to the master station 102. The method 400 continues at operation 452 with the master station 102 transmitting a TF-R 409. As discussed in conjunction with FIG. 3 HEW STA 2 104.2 may determine to use a resource allocation indicated in the TF-R 409 such as AID 0 410.3. The method 400 continues at operation 454 with HEW STA 2 104.2 transmitting UL data 414 in accordance with the TF-R 409 resource allocation HEW STA 2 104.2 determined it could use. The method 400 continues at operation 456 with the master station 102 transmitting a MU ACK 416 which may include an acknowledgement of the UL data 414. The UL data 414 may be a request a resource request to the master station 102.

The method 400 may continue at operation 458 with HEW STA 1 104.1 transmitting UL data 406.1 and UL data 406.2. The mode count 470.1 of HEW STA 1 104.1 may have been zero prior to operation 458. The master station 102 may not respond to the UL data 406.1 and UL data 406.2 which may result in the mode count 470.1 being incremented twice once for each EDCA transmission failure.

The method 400 may continue at operation 460 and 462 with the master station 102 transmitting beacon frame 418.n through beacon frame 418.n. HEW STA 1 104.1 may enter EDCA restricted mode 420 if the mode count is equal to or exceeds a threshold value. The threshold may have been two. HEW STA 1 104.1 may then have to wait $(2^i)$ or $(2^i-1)$ beacon frames 418 before leaving EDCA restriction mode where i is the value of mode count 470.1. In some embodiments, mode count 470.1 may be adjusted in accordance with embodiments disclosed in conjunction with FIG. 3. In some embodiments, HEW STA 1 104.1 may leave or enter EDCA restriction mode in accordance with embodiments disclosed in conjunction with FIG. 3. As an example, if mode count 470 right before operation 460 and the threshold is two then HEW STA 1 104.1 may enter EDCA restriction mode 420 for $(2^i)=4$, in one embodiment, or $(2^i-1)=3$, in another embodiment, beacon frames 418.

Figure 5:
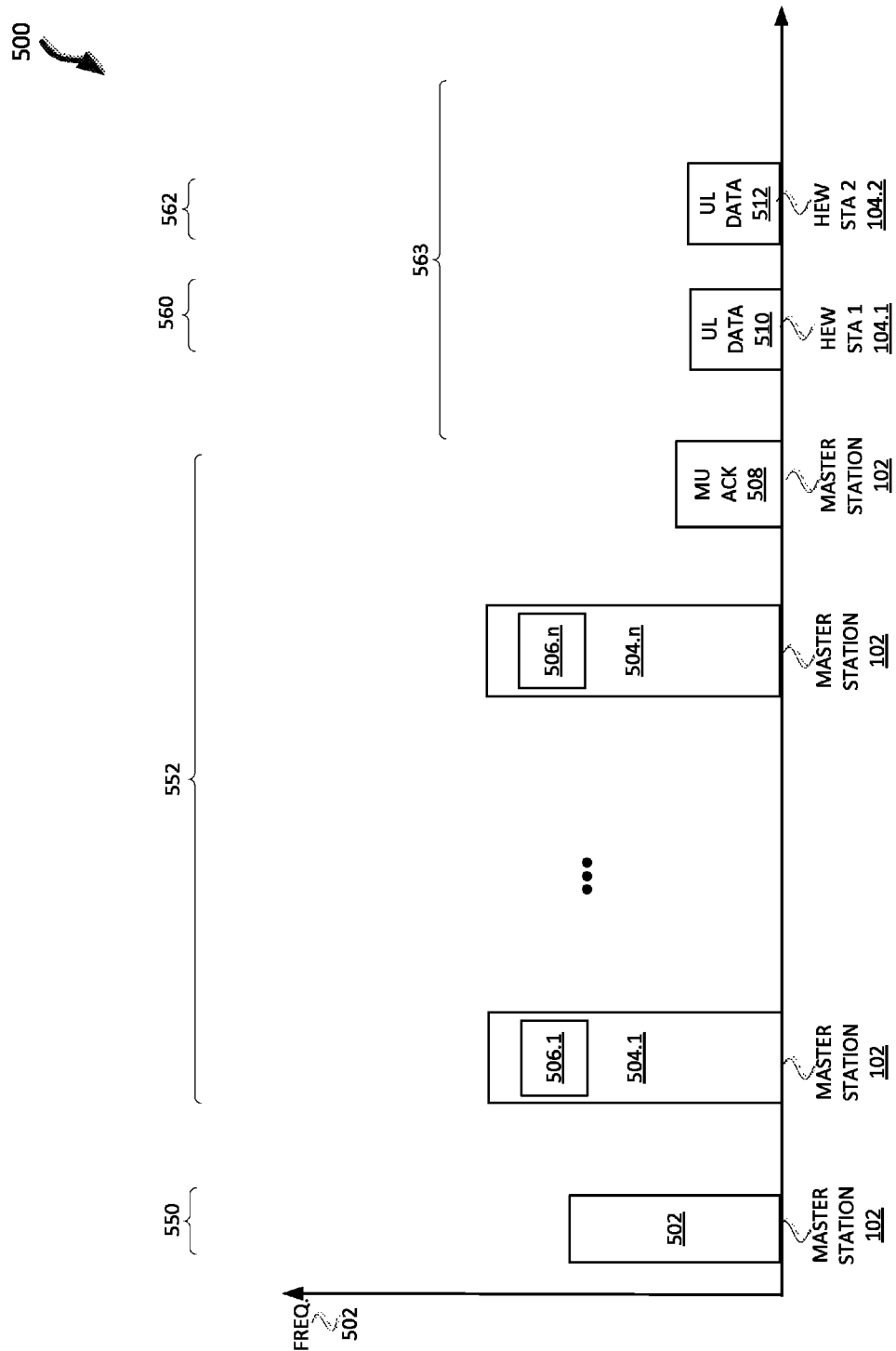
FIG. 5 illustrates a method for restricting EDCA in accordance with some embodiments.

FIG. 5 illustrates a method 500 for restricting EDCA in accordance with some embodiments. Illustrated in FIG. 5 is frequency 502 along a vertical axis and time 504 along a horizontal axis. The device transmitting is indicated below the time 504. The operation is indicated along the top.

The method 500 begins at operation 550 with the master station 102 transmitting a beacon frame 502. The method 500 continues at operation 552 with the master station 102 transmitting cascaded TF-R 504.1 through TF-R 504.n. The HEW STA 104 may not be permitted to attempt EDCA transmissions until after the last MU ACK 508. The cascaded TF-Rs 504 may include an indication 506 if there is a next TF-R 504. Indication 506.1 may indicate there is one or more additional cascaded TF-Rs 504, and indication 506.n may indicate that it is the last cascaded TF-R 504. Until MU ACK 508 is transmitted the HEW STA 104 may be restricted from attempting EDCA transmissions.

The method 500 may continue at operation 560 and operation 562 with HEW STA 1 104.1 and HEW STA 2 104.2, respectively, transmitting UL data 510 and UL data 512. The HEW STAs 104 may be permitted to attempt EDCA transmission in period 563 as long as the HEW STAs 104 are not in EDCA restricted mode as described herein. The method 500 may end.

Figure 6:
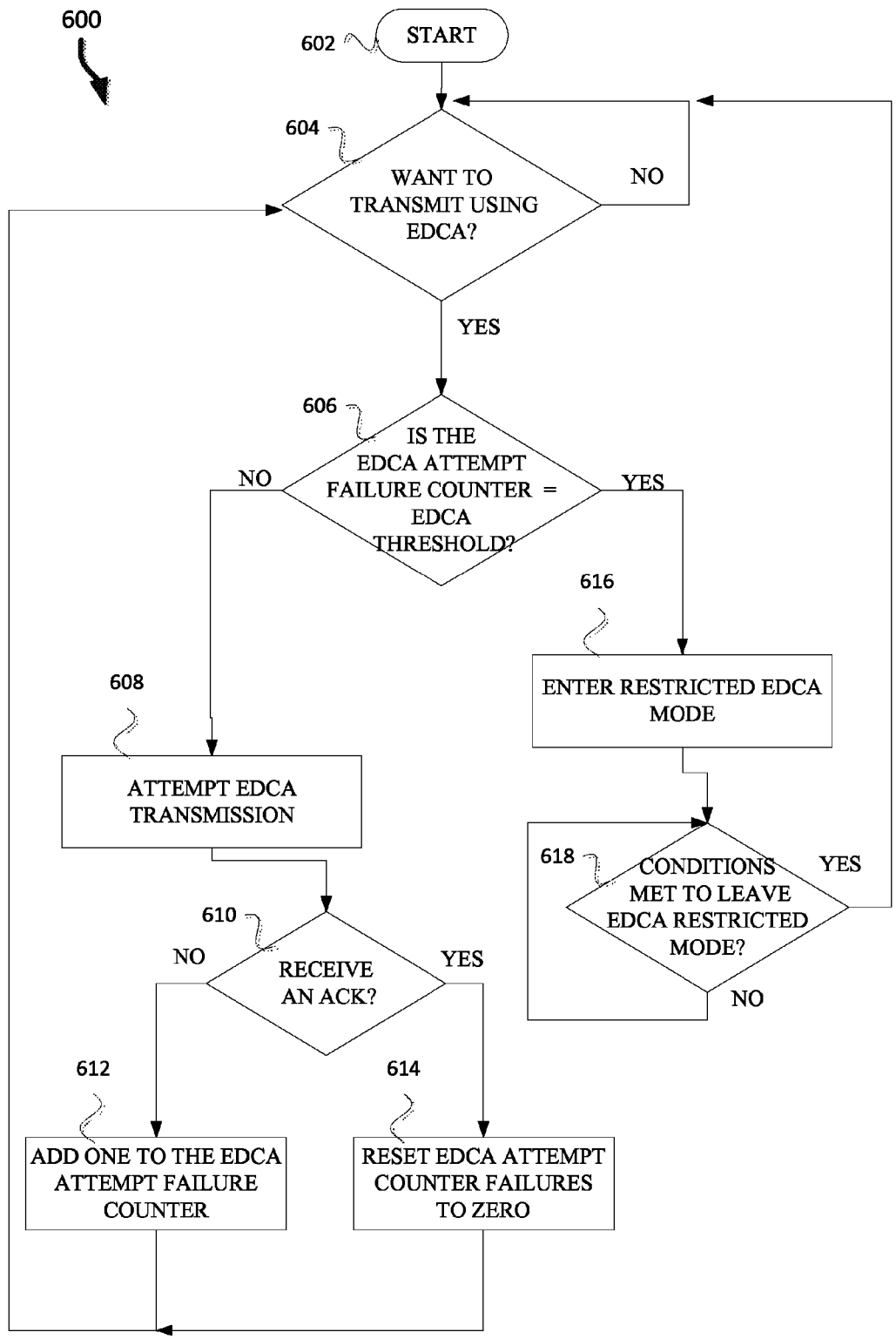
FIG. 6 illustrates a method for restricting EDCA in accordance with some embodiments.

FIG. 6 illustrates a method 600 for restricting EDCA in accordance with some embodiments. The method 600 begins at operation 602 with start. The method 600 continues at operation 604 with determining whether a station, which may be a HEW STA 104 wants to transmit using EDCA. If the station does not want to transmit using EDCA, then the method 600 may return to operation 604. If the station wants to transmit using EDCA, then the method 600 continues at operation 606 with is the EDCA attempt failure counter=EDCA threshold. For example, HEW STA 1 104.1 in FIG. 4 at operation 460 had a mode count 470.1 of 2 which was equal to the threshold or EDCA threshold. If the EDCA attempt failure counter is equal to the EDCA threshold, then the method 600 continues with operation 616 entering EDCA restricted mode. For example, HEW STA 1 104.1 in FIG. 4 entered EDCA restricted mode at operation 460 (FIG. 4). HEW STA 1 104.1 entered EDCA restricted mode after operation 350 (FIG. 3). In some embodiments, the EDCA threshold may be a number between 1 and 16 inclusive. In some embodiments, a different value for the EDCA threshold is used. In some embodiments, the EDCA threshold may vary according to the communication conditions.

The method 600 continues at operation 618 with conditions met to leave EDCA restricted mode. For example, the conditions may be that the HEW STA 104 wait for a number of beacons determined based on a number of previous EDCA transmission failures. For example, HEW STA 1 104.1 for $(2^i)=4$, in one embodiment, or $(2^i-1)=3$, in another embodiment, beacon frames 418 (FIG. 4). The number of beacon frames may be a different number. In some embodiments, the conditions can be met to leave restricted mode EDCA by a station transmitting in a TF-R. For example, HEW STA 2 104.2 had its mode count 370.2 reset to zero and left EDCA restricted mode after transmitting UL data 314 (FIG. 3). When the station is not in EDCA restricted mode, this may be termed non-EDCA restricted mode.

If the conditions are met to leave EDCA restricted mode, then the method 600 returns to operation 604. If at operation 606 the EDCA attempt failure counter is not equal to the EDCA threshold, then the method 600 may continue at operation 608 with attempting EDCA transmission. For example, HEW STA 1 104.1 attempts an EDCA transmission at operation 458 of FIG. 4. The method 600 may continue at operation 610 with receive an ACK. The station may determine whether an ACK is received based on waiting a predetermined time. If an ACK is received the method 600 continues at operation 614 with reset EDCA attempt failures to zero. If an ACK is not received then the method continues at operation 612 with add one to the EDCA attempt failure counter. For example, at operation 458 (FIG. 4) one is added to the mode count 470.1 for UL data 406.1 and UL data 406.2 since no response 408 was received from the master station 102. The method 600 may return to operation 604. The method 600 may end when a station is not in a mode that it might transmit using EDCA.

Figure 7:
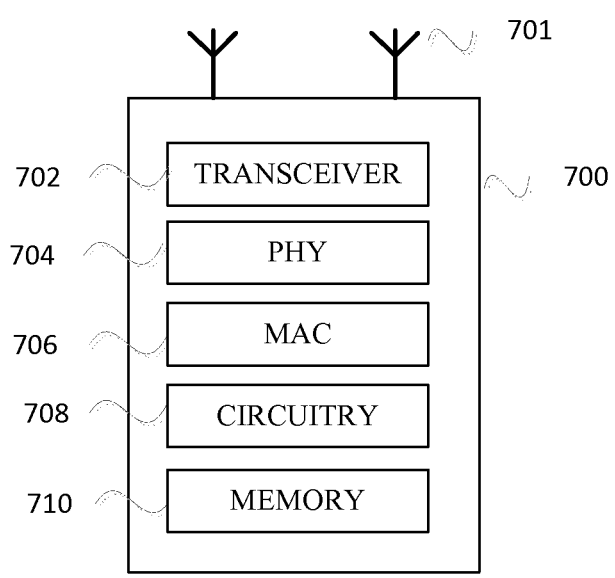
FIG. 7 illustrates a HEW device in accordance with some embodiments.

FIG. 7 illustrates a HEW device 700 in accordance with some embodiments. HEW device 700 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 700 may be suitable for operating as master station 102 (FIG. 1) or a HEW STA 104 (FIG. 1). In accordance with embodiments, HEW device 700 may include, among other things, a transmit/receive element 701 (for example an antenna), a transceiver 702, physical (PHY) circuitry 704, and media access control (MAC) circuitry 706. PHY circuitry 704 and MAC circuitry 706 may be HEW compliant layers and may also be compliant with one or more legacy IEEE 802.13 standards. MAC circuitry 706 may be arranged to configure packets such as a physical layer convergence procedure (PLCP) protocol data unit (PPDUs) and arranged to transmit and receive PPDUs, among other things. HEW device 700 may also include circuitry 708 and memory 710 configured to perform the various operations described herein. The circuitry 708 may be coupled to the transceiver 702, which may be coupled to the transmit/receive element 701. While FIG. 7 depicts the circuitry 708 and the transceiver 702 as separate components, the circuitry 708 and the transceiver 702 may be integrated together in an electronic package or chip.

In some embodiments, the MAC circuitry 706 may be arranged to contend for a wireless medium during a contention period to receive control of the medium for the HEW control period and configure an HEW PPDU. In some embodiments, the MAC circuitry 706 may be arranged to contend for the wireless medium based on channel contention settings, a transmitting power level, and a CCA level.

The PHY circuitry 704 may be arranged to transmit the HEW PPDU. The PHY circuitry 704 may include circuitry for modulation/demodulation, upconversion/downconversion, filtering, amplification, etc. In some embodiments, the circuitry 708 may include one or more processors. The circuitry 708 may be configured to perform functions based on instructions being stored in a RAM or ROM, or based on special purpose circuitry. The circuitry 708 may include processing circuitry and/or transceiver circuitry in accordance with some embodiments. The circuitry 708 may include a processor such as a general purpose processor or special purpose processor. The circuitry 708 may implement one or more functions associated with transmit/receive elements 701, the transceiver 702, the PHY circuitry 704, the MAC circuitry 706, and/or the memory 710.

In some embodiments, the circuitry 708 may be configured to perform one or more of the functions and/or methods described herein and/or in conjunction with FIGS. 1-7.

In some embodiments, the transmit/receive elements 701 may be two or more antennas that may be coupled to the PHY circuitry 704 and arranged for sending and receiving signals including transmission of the HEW packets. The transceiver 702 may transmit and receive data such as HEW PPDU and packets that include an indication that the HEW device 700 should adapt the channel contention settings according to settings included in the packet. The memory 710 may store information for configuring the other circuitry to perform operations for configuring and transmitting HEW packets and performing the various operations to perform one or more of the functions and/or methods described herein and/or in conjunction with FIGS. 1-7.

In some embodiments, the HEW device 700 may be configured to communicate using OFDM communication signals over a multicarrier communication channel. In some embodiments, HEW device 700 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 700 may use 4× symbol duration of 802.11n or 802.11 ac.

In some embodiments, an HEW device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 701 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 700 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a high-efficiency wireless local-area network (HEW) station. The apparatus comprising processing circuitry and transceiver circuitry configured to: configure the HEW station for operation in enhanced distributed coordinated access (EDCA) restricted mode, wherein in EDCA restricted mode the HEW station is configured to refrain from EDCA packet transmissions, and configure the HEW station for operation in non-EDCA restricted mode. In non-EDCA restricted mode the HEW station may be configured to: increase a EDCA attempt failure counter when acknowledgement of an EDCA-transmitted packet is not received within a predetermined period of time, and enter EDCA restricted mode when the EDCA attempt failure counter equals a EDCA threshold.

In Example 2, the subject matter of Example 1 can optionally include where in EDCA restricted mode, the processing circuitry and transceiver circuitry are configured to: in response to receipt of a trigger frame for random access (TF-R), reset the EDCA attempt failure counter and enter non-EDCA restricted mode.

In Example 3, the subject matter of Example 1 or Example 2 can optionally include where the processing circuitry and transceiver circuitry are configured to: set a backoff counter, select a resource allocation indicated in the TF-R based on the backoff counter, and transmit a packet in accordance with the resource allocation.

In Example 4, the subject matter of any of Examples 1-3 can optionally include where in non-EDCA restricted mode, the processing circuitry and transceiver circuitry are configured to: transmit a packet in accordance with orthogonal frequency division multiple access (OFDMA) and orthogonal frequency division multiple access distributed channel access (ODCA) for an uplink transmission and increase the EDCA attempt failure counter if an acknowledgement of the packet is not received within a predetermined period of time.

In Example 5, the subject matter of any of Examples 1-4 can optionally include where in non-EDCA restricted mode, the processing circuitry and transceiver circuitry are configured to: in response to receipt of a trigger frame for random access (TF-R), reset the EDCA attempt failure counter.

In Example 6, the subject matter of any of Examples 1-5 can optionally include where wherein in non-EDCA restricted mode, the processing circuitry and transceiver circuitry are configured to: enter the EDCA restricted mode and set a beacon count based on the EDCA attempt failure counter, if the EDCA attempt failure counter equals the EDCA threshold.

In Example 7, the subject matter of any of Examples 1-6 can optionally include where in EDCA restricted mode, the processing circuitry and transceiver circuitry are configured to: receive a beacon frame from a master station; and reduce the beacon count by one and if the beacon count is equal to zero then enter non-EDCA restricted mode and reset the EDCA attempt failure counter.

In Example 8, the subject matter of Examples 6 can optionally include where the beacon count is set to two raised to the power of the EDCA attempt failure counter or two raised to the power of the EDCA attempt failure counter minus one.

In Example 9, the subject matter of Examples 6 can optionally include where the beacon count is set based on the EDCA attempt failure counter raised to a power.

In Example 10, the subject matter of any of Examples 1-9 can optionally include where in non-EDCA restricted mode the processing circuitry and transceiver circuitry are configured to: receive a cascade trigger frame for a random access (TF-R), and reframe from transmitting a packet in accordance with EDCA until after a next cascade TF-R is received that indicates it is a last cascade TF-R and until after a multi-user block acknowledgment associated with the next cascade TF-R is received.

In Example 11, the subject matter of any of Examples 1-10 can optionally include where the processing circuitry and transceiver circuitry are configured to: set the EDCA threshold based on one from the following group: a EDCA threshold value indicated in an Institute of Electrical and Electronic Engineers (IEEE) 802.11ax standard, the EDCA threshold value indicated in a received management frame, the EDCA threshold value indicated in a received beacon frame, and the EDCA threshold value indicated in a received trigger frame.

In Example 12, the subject matter of any of Examples 1-11 can optionally include where in non-EDCA restricted mode the processing circuitry and transceiver circuitry are configured to: reframe from contending for a wireless medium using EDCA between an acknowledgment transmission of a first trigger frame for random access (TF-R) and either a transmission of a second TF-R or until an end of a target beacon transmission time (TBTT), wherein at the end of the TBTT the EDCA attempt failure counter is reset.

In Example 13, the subject matter of any of Examples 1-12 can optionally include where the processing circuitry and transceiver circuitry are configured to: reduce the EDCA attempt failure counter each time a beacon interval occurs, wherein the EDCA attempt failure counter is not reduced below zero.

In Example 14, the subject matter of any of Examples 1-13 can optionally include memory coupled to the processing circuitry and transceiver circuitry; and one or more antennas coupled to the processing circuitry and transceiver circuitry.

Example 15 is a non-transitory computer-readable storage medium that stores instructions for execution by one or more processors. The instructions may be to configure the one or more processors to cause a high-efficiency wireless local-area network (HEW) station to: configure the HEW station for operation in enhanced distributed coordinated access (EDCA) restricted mode, wherein in EDCA restricted mode the HEW station is configured to refrain from EDCA packet transmissions, and configure the HEW station for operation in non-EDCA restricted mode. In non-EDCA restricted mode the HEW station may be configured to: increase a EDCA attempt failure counter when acknowledgement of an EDCA-transmitted packet is not received within a predetermined period of time, and enter EDCA restricted mode when the EDCA attempt failure counter equals a EDCA threshold.

In Example 16, the subject matter of Example 15 can optionally include where in EDCA restricted mode, the instructions are to configure the one or more processors to cause a high-efficiency wireless local-area network (HEW) station to: reset the EDCA attempt failure counter and enter non-EDCA restricted mode, in response to receipt of a trigger frame for random access (TF-R).

In Example 17, the subject matter of Examples 15 or 16 can optionally include where the instructions are to configure the one or more processors to cause a high-efficiency wireless local-area network (HEW) station to: set a backoff counter, select a resource allocation indicated in the TF-R based on the backoff counter, and transmit a packet in accordance with the resource allocation.

In Example 18, the subject matter of any of Examples 15-17 can optionally include where in non-EDCA restricted mode, the instructions are to configure the one or more processors to cause a high-efficiency wireless local-area network (HEW) station to: transmit a packet in accordance with orthogonal frequency division multiple access (OFDMA) and orthogonal frequency division multiple access distributed channel access (ODCA) for an uplink transmission and increase the EDCA attempt failure counter if an acknowledgement of the packet is not received within a predetermined period of time.

Example 19 is a method performed by a high-efficiency wireless local-area network (HEW) station. The method may include reframing from transmitting EDCA packets, if the HEW station is in enhanced distributed coordinated access (EDCA) restricted mode, and if the HEW station is in non-EDCA restricted mode, increasing a EDCA attempt failure counter when acknowledgement of an EDCA-transmitted packet is not received within a predetermined period of time, and entering EDCA restricted mode when the EDCA attempt failure counter equals a EDCA threshold.

In Example 20, the subject matter of Example 19 can optionally include in response to receipt of a trigger frame for random access (TF-R), reset the EDCA attempt failure counter and enter non-EDCA restricted mode.

Example 21 is an apparatus of a high-efficiency wireless local-area network (HEW) station. The apparatus may include means for configuring the HEW station for operation in enhanced distributed coordinated access (EDCA) restricted mode, wherein in EDCA restricted mode the HEW station is configured to refrain from EDCA packet transmissions, and means for configuring the HEW station for operation in non-EDCA restricted mode. In non-EDCA restricted mode the HEW station may be configured to: increase a EDCA attempt failure counter when acknowledgement of an EDCA-transmitted packet is not received within a predetermined period of time, and enter EDCA restricted mode when the EDCA attempt failure counter equals a EDCA threshold.

In Example 22, the subject matter of Example 21 can optionally include where in EDCA restricted mode, the apparatus further comprises: in response to receipt of a trigger frame for random access (TF-R), means for resetting the EDCA attempt failure counter and enter non-EDCA restricted mode.

In Example 23, the subject matter of Examples 21 or 22 can optionally include where the apparatus is further comprises: means for setting a backoff counter, means for selecting a resource allocation indicated in the TF-R based on the backoff counter, and means for transmitting a packet in accordance with the resource allocation.

In Example 24, the subject matter of any of Examples 21-23 can optionally include where in non-EDCA restricted mode, the apparatus further comprises: means for transmitting a packet in accordance with orthogonal frequency division multiple access (OFDMA) and orthogonal frequency division multiple access distributed channel access (ODCA) for an uplink transmission and increase the EDCA attempt failure counter if an acknowledgement of the packet is not received within a predetermined period of time.

In Example 25, the subject matter of any of Examples 21-24 can optionally include where in non-EDCA restricted mode, the apparatus further comprises: in response to receipt of a trigger frame for random access (TF-R), means for resetting the EDCA attempt failure counter.

In Example 26, the subject matter of any of Examples 21-25 can optionally include where in non-EDCA restricted mode, the apparatus further comprising: means for entering the EDCA restricted mode and set a beacon count based on the EDCA attempt failure counter, if the EDCA attempt failure counter equals the EDCA threshold.

In Example 27, the subject matter of Example 26 can optionally include where in EDCA restricted mode, the apparatus further comprises means for receiving a beacon frame from a master station, and means for reducing the beacon count by one and if the beacon count is equal to zero then enter non-EDCA restricted mode and reset the EDCA attempt failure counter.

In Example 28, the subject matter of Example 26 can optionally include where the beacon count is set to two raised to the power of the EDCA attempt failure counter or two raised to the power of the EDCA attempt failure counter minus one.

In Example 29, the subject matter of Example 26 can optionally include where the beacon count is set based on the EDCA attempt failure counter raised to a power.

In Example 30, the subject matter of any of Examples 21-29 can optionally include means for receiving a cascade trigger frame for a random access (TF-R), and means for reframing from transmitting a packet in accordance with EDCA until after a next cascade TF-R is received that indicates it is a last cascade TF-R and until after a multi-user block acknowledgment associated with the next cascade TF-R is received.

In Example 31, the subject matter of any of Examples 21-30 can optionally include means for setting the EDCA threshold based on one from the following group: a EDCA threshold value indicated in an Institute of Electrical and Electronic Engineers (IEEE) 802.11 ax standard, the EDCA threshold value indicated in a received management frame, the EDCA threshold value indicated in a received beacon frame, and the EDCA threshold value indicated in a received trigger frame.

In Example 32, the subject matter of any of Examples 21-31 can optionally include in non-EDCA restricted mode means for reframing from contending for a wireless medium using EDCA between an acknowledgment transmission of a first trigger frame for random access (TF-R) and either a transmission of a second TF-R or until an end of a target beacon transmission time (TBTT), wherein at the end of the TBTT the EDCA attempt failure counter is reset.

In Example 33, the subject matter of any of Examples 21-32 can optionally include where the apparatus further comprises means for reducing the EDCA attempt failure counter each time a beacon interval occurs, wherein the EDCA attempt failure counter is not reduced below zero.

In Example 34, the subject matter of any of Examples 31-32 can optionally include means for processing circuitry and means for transceiver circuitry; and means for transmitting and receive radio frequency waves coupled to the means for transceiver circuitry.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station configured to operate in a wireless local-area network, the apparatus comprising: memory; and, processing circuitry coupled to the memory, wherein the processing circuitry is configured to:
   configure the HE station for operation in enhanced distributed coordinated access (EDCA) restricted mode, wherein in EDCA restricted mode the HE station is configured to refrain from EDCA packet transmissions;
   configure the HE station for operation in non-EDCA restricted mode wherein in non-EDCA restricted mode the HE station is configured to:
      increase a EDCA attempt failure counter when acknowledgement of an EDCA-transmitted packet is not received within a predetermined period of time; and
      enter EDCA restricted mode when the EDCA attempt failure counter equals a EDCA threshold; and
   set the EDCA threshold based on one from the following group: a EDCA threshold value indicated in an Institute of Electrical and Electronic Engineers (IEEE) 802.11ax standard, the EDCA threshold value indicated in a received management frame, the EDCA threshold value indicated in a received beacon frame, and the EDCA threshold value indicated in a received trigger frame.

2. The apparatus of claim 1, wherein in EDCA restricted mode, the processing circuitry is configured to:
in response to receipt of a trigger frame for random access (TF-R), reset the EDCA attempt failure counter and enter non-EDCA restricted mode.

3. The apparatus of claim 2, wherein the processing circuitry is configured to:
set a backoff counter;
select a resource allocation indicated in the TF-R based on the backoff counter; and
transmit a packet in accordance with the resource allocation.

4. The apparatus of claim 1, wherein in non-EDCA restricted mode, the processing circuitry is configured to:
transmit a packet in accordance with orthogonal frequency division multiple access (OFDMA) and orthogonal frequency division multiple access distributed channel access (ODCA) for an uplink transmission and increase the EDCA attempt failure counter if an acknowledgement of the packet is not received within a predetermined period of time.

5. The apparatus of claim 1, wherein in non-EDCA restricted mode, the processing circuitry is configured to:
in response to receipt of a trigger frame for random access (TF-R), reset the EDCA attempt failure counter.

6. The apparatus of claim 1, wherein in non-EDCA restricted mode, the processing circuitry is configured to:
enter the EDCA restricted mode and set a beacon count based on the EDCA attempt failure counter, if the EDCA attempt failure counter equals the EDCA threshold.

7. The apparatus of claim 6, wherein in EDCA restricted mode, the processing circuitry is configured to:
receive a beacon frame from a master station; and
reduce the beacon count by one and if the beacon count is equal to zero then enter non-EDCA restricted mode and reset the EDCA attempt failure counter.

8. The apparatus of claim 6, wherein the beacon count is set to two raised to the power of the EDCA attempt failure counter or two raised to the power of the EDCA attempt failure counter minus one.

9. The apparatus of claim 6, wherein the beacon count is set based on the EDCA attempt failure counter raised to a power.

10. The apparatus of claim 1, wherein in non-EDCA restricted mode the processing circuitry is configured to:
receive a cascade trigger frame for a random access (TF-R); and
reframe from transmitting a packet in accordance with EDCA until after a next cascade TF-R is received that indicates it is a last cascade TF-R and until after a multi-user block acknowledgment associated with the next cascade TF-R is received.

11. The apparatus of claim 1, wherein in non-EDCA restricted mode the processing circuitry is configured to:
reframe from contending for a wireless medium using EDCA between an acknowledgment transmission of a first trigger frame for random access (TF-R) and either a transmission of a second TF-R or until an end of a target beacon transmission time (TBTT), wherein at the end of the TBTT the EDCA attempt failure counter is reset.

12. The apparatus of claim 1, wherein the processing circuitry is configured to:
reduce the EDCA attempt failure counter each time a beacon interval occurs, wherein the EDCA attempt failure counter is not reduced below zero.

13. The apparatus of claim 1, further comprising transceiver circuitry coupled to the processing circuitry; and one or more antennas coupled to the transceiver circuitry.

14. A non-transitory computer-readable storage medium that stores instructions for execution by one or more processors, the instructions to configure the one or more processors to cause an apparatus of a high-efficiency (HE) station configured to operate in a wireless local-area network to:
configure the HE station for operation in enhanced distributed coordinated access (EDCA) restricted mode, wherein in EDCA restricted mode the HE station is configured to refrain from EDCA packet transmissions;
configure the HE station for operation in non-EDCA restricted mode wherein in non-EDCA restricted mode the HE station is configured to:
increase a EDCA attempt failure counter when acknowledgement of an EDCA-transmitted packet is not received within a predetermined period of time; and
enter EDCA restricted mode when the EDCA attempt failure counter equals a EDCA threshold; and
set the EDCA threshold based on one from the following group: a EDCA threshold value indicated in an Institute of Electrical and Electronic Engineers (IEEE) 802.11ax standard, the EDCA threshold value indicated in a received management frame, the EDCA threshold value indicated in a received beacon frame, and the EDCA threshold value indicated in a received trigger frame.

15. The non-transitory computer-readable storage medium of claim 14, wherein in EDCA restricted mode, the instructions are to configure the one or more processors to cause a station to:
reset the EDCA attempt failure counter and enter non-EDCA restricted mode, in response to receipt of a trigger frame for random access (TF-R).

16. The non-transitory computer-readable storage medium of claim 15, wherein the instructions are to configure the one or more processors to cause the apparatus of the HE station to:
set a backoff counter;
select a resource allocation indicated in the TF-R based on the backoff counter; and
transmit a packet in accordance with the resource allocation.

17. The non-transitory computer-readable storage medium of claim 14, wherein in non-EDCA restricted mode, the instructions are to configure the one or more processors to cause the apparatus of the HE station to:
transmit a packet in accordance with orthogonal frequency division multiple access (OFDMA) and orthogonal frequency division multiple access distributed channel access (ODCA) for an uplink transmission and increase the EDCA attempt failure counter if an acknowledgement of the packet is not received within a predetermined period of time.

18. A method performed by an apparatus of a high-efficiency (HE) station configured to operate in a wireless local-area network, the method comprising:
reframing from transmitting EDCA packets, if the HE station is in enhanced distributed coordinated access (EDCA) restricted mode;

if the HE station is in non-EDCA restricted mode, increasing a EDCA attempt failure counter when acknowledgement of an EDCA-transmitted packet is not received within a predetermined period of time, and entering EDCA restricted mode when the EDCA attempt failure counter equals a EDCA threshold; and set the EDCA threshold based on one from the following group: a EDCA threshold value indicated in an Institute of Electrical and Electronic Engineers (IEEE) 802.11ax standard, the EDCA threshold value indicated in a received management frame, the EDCA threshold value indicated in a received beacon frame, and the EDCA threshold value indicated in a received trigger frame.

19. The method of claim 18, further comprising:

in response to receipt of a trigger frame for random access (TF-R), reset the EDCA attempt failure counter and enter non-EDCA restricted mode.

* * * * *